(12) United States Patent
Wermuth

(10) Patent No.: US 8,908,707 B2
(45) Date of Patent: Dec. 9, 2014

(54) BANDWIDTH ALLOCATION IN AD HOC NETWORKS

(76) Inventor: Michal Wermuth, Haifa (IL)

( * ) Notice: Subject to any disclaimer, the term of this patent is extended or adjusted under 35 U.S.C. 154(b) by 1155 days.

(21) Appl. No.: 12/307,924

(22) PCT Filed: Jul. 9, 2007

(86) PCT No.: PCT/IL2007/000858
§ 371 (c)(1),
(2), (4) Date: Jan. 8, 2009

(87) PCT Pub. No.: WO2008/007362
PCT Pub. Date: Jan. 17, 2008

(65) Prior Publication Data
US 2009/0290558 A1 Nov. 26, 2009

(30) Foreign Application Priority Data
Jul. 10, 2006 (IL) .......................................... 176759

(51) Int. Cl.
*H04L 12/28* (2006.01)
*H04L 12/43* (2006.01)
*H04W 72/08* (2009.01)
*H04W 8/26* (2009.01)
*H04W 28/04* (2009.01)
*H04W 74/04* (2009.01)
*H04W 84/18* (2009.01)

(52) U.S. Cl.
CPC .............. *H04W 72/082* (2013.01); *H04W 8/26* (2013.01); *H04W 28/04* (2013.01); *H04W 74/04* (2013.01); *H04W 84/18* (2013.01)
USPC ........................... 370/406; 370/461; 370/468

(58) Field of Classification Search
None
See application file for complete search history.

(56) References Cited

U.S. PATENT DOCUMENTS

| 6,496,941 | B1* | 12/2002 | Segal et al. ..................... 714/4.2 |
| 7,616,961 | B2* | 11/2009 | Billhartz ..................... 455/452.2 |
| 2003/0067892 | A1* | 4/2003 | Beyer et al. ..................... 370/328 |
| 2003/0137993 | A1* | 7/2003 | Odman ........................ 370/468 |
| 2005/0163151 | A1* | 7/2005 | Ferguson et al. ............. 370/449 |

OTHER PUBLICATIONS

R. Rozovsky and P. R. Kumar, "Seedex: a MAC protocol for ad hoc networks" The ACM International Symposium on Mobile Ad Hoc Networking and Computing, pp. 67-75, 2001.
V. R.Syrotiuk, Charles J.Colbourn and Alan C.H.Ling, "Topology-Transparent Scheduling for MANETs using Orthogonal Arrays" DIAL-M/POMC 2003: San Diego, California, USA, pp. 43-49, 2003.
L. Bao and J. J. Garcia-Luna-Aceves, "Distributed Dynamic Channel Access Scheduling for ad hoc Networks" Journal of Parallel and Distributed Computing , vol. 63, pp. 3-14, Jan. 2003.

* cited by examiner

*Primary Examiner* — Christine Duong

(57) ABSTRACT

A potentially interfering node updatable database associated with the MAC, in each node, contains a limited number of unique identification numbers (UNIDs) referring to nodes likely to interfere with the transmission of the node. Typically these UNIDs are one or two hop neighbors. In addition to the actual nodes, the database also contains unique ID numbers of dummy nodes. Practically, the node database does not distinguish between real or dummy nodes. Selecting a certain node to transmit at a certain TS is brought about by a "which node is to transmit in the next TS" (WINIT) function. This function takes into account all the UNIDs available in the UNID databases of the different nodes. When the WINIT selects a specific UNID to be active in the upcoming TS, the relevant MAC element in the respective node, invokes the transmission.

5 Claims, 5 Drawing Sheets

BANDWIDTH ALLOCATION IN AD HOC NETWORKS

FIELD OF THE INVENTION

The present invention is in the field of communications networks. More specifically the invention relates to bandwidth restricted wireless ad hoc networks.

BACKGROUND OF THE INVENTION

The open system Interconnection (OSI) reference model of a communications network includes a data link control layer which controls the sharing of the network among the physical end-points. The data link control layer is subdivided into two sub-layers, the logical link control (LLC) sub-layer and the media access control (MAC) sub-layer. The MAC sub-layer uses a unique address to identify each node (end-point) in the system in order to share the network among the entire different end-points of the network. In mobile and ad hoc wireless networks, (MANETs) as well as sensor networks, there is no dedicated or central node that organizes the channel in general and the access to the channel in particular. The MAC system in such networks has to minimize collision phenomena, i.e. the transmission of packets by different nodes so that none of the receiving nodes receives more than one packet at a time, with loss of data. This discussed by R. Rozovsky and P. R. Kumar, "Seedex: a MAC protocol for ad hoc networks", The ACM International Symposium on Mobile Ad Hoc Networking and Computing, pp. 67-75, 2001 the contents of which are incorporated herein by reference. Another requirement from such MAC systems is that they support broadcast messages (i.e., one-to-many), and be quality of service (QoS) aware, such as by providing delay guarantee, as discussed by V. R. Syrotiuk, Charles J. Colbourn and Alan C. H. Ling, "Topology-Transparent Scheduling for MANETs using Orthogonal Arrays", DIAL-M/POMC 2003: San Diego, Calif., USA, pp 43-49, 2003, the contents of which are incorporated herein by reference.

An ad hoc wireless communications network is a wireless network having no central organizing node or a pre-defined infrastructure. Usually, all the participating nodes are to make decisions and all nodes within the range of a transmitting node receive packets from aforementioned node. Typically, the invention is implemented in ad hoc wireless networks in which each node is unaware of the total network topology; rather it utilizes for each node the local topology. Therefore, in the context of the environment in which the present invention is implemented even as nodes are referred to as interacting in the network, in fact only a topologically defined fraction of the network which is relevant for each node. Such a network was presented by L. Bao and J. J. Garcia-Luna-Aceves, "Distributed Dynamic Channel Access Scheduling for ad hoc Networks", Journal of Parallel and Distributed Computing, Volume 63, pp. 3-14, January 2003, the contents of which are incorporated herein by reference. In such a network, the MAC system is also distributed among some or all of the participating nodes. In a wireless communications channel of the invention, the distribution mode of time slots $S_1 \ldots S_n$ is known to the various nodes. The slots are available to Mynode in compliance with rules, some of which will be discussed below. A set of nodes (end-points), optionally mobile in space, are listed in Mynode's node database. Each such node if defined as potential interfering node is potentially capable of sending a message, at any slot along the time axis and such a message may collide with Mynode's message if it is sent at the same time. In the network discussed hereinbefore, other nodes are possibly participating, which are not listed in Mynode's node database and are therefore not considered as potential interfering nodes. Mynode's MAC element invokes a slot scheduler, such that only one of the nodes listed Mynode's node data base can send a message to the contemporary slot. The number of nodes stored in Mynode's node database may be dynamic, but every node possesses a unique ID.

The environment in which the present invention is implemented is that of an ad hoc communications network using one or more single time-slotted channels in which the nodes are dynamically allocated shares of the available bandwidth in one channel. The invention relates to service in which the messages sent by the nodes are broadcast messages, meaning that a packet sent by a node can be potentially received by all its node neighbors. Each node uses an omni-directional antenna capable of potentially interconnecting with all its node neighbors. Due to bandwidth limitations, the available bandwidth is shared between nodes in correlation with the bandwidth demand of each node. The average time-slot (TS) rate that a node demands for transmission is referred to as TS refresh rate. A node with a high TS refresh rate demands more bandwidth from the available bandwidth than a node with a lower refresh rate. An example for such nodes bandwidth sharing is described as follows. In a road traffic control system, Myvehicle updates its own vehicle database in order to avoid road accidents. The other vehicles potentially capable of intercepting Myvehicle send position messages in frequency correlated with their velocity. The faster a vehicle travels the more frequent the update signal is sent to the potentially susceptible vehicle.

Typically the service implements a multi-hop routing. Unlike some ad hoc communications systems using one hop or two hop routing, the network of the present invention is not restricted to two hop routing and three or even higher hop levels can be implemented. In all hop levels, the system is to prevent or minimize collision phenomena in broadcast messages, i.e. the transmitting of packets by different nodes so that receiving nodes do not receive more than one packet at once from different senders, causing loss of data. To more elaborately explain the access of node to time slots in a channel, reference is made to FIG. 1 which describes a slot selecting system as known in the art. Time slotted wireless communications channel 20 has time slots (TSs) $S_1 \ldots S_n$. Time slot characteristics and distribution along the time axis are known to all nodes. The TSs are available to any node in compliance with the rules governing the access to the slots, some of which will be discussed below. The distribution of nodes in space may be randomized and dynamic, affecting the connectivity of the nodes with Mynode and with other nodes. A node database in Mynode contains the list of the IDs of nodes which are likely to inter-collide in slots of the channel. For example, in U.S. Pat. No. 5,396,644, the contents of which are incorporated herewith by reference, a node stores data of its near neighbours and the neighbours of each neighbour (two-hop neighbours), and whenever it sends a neighbour update signal, it sends also a list of near neighbours. This way, each node is always kept updated as of the list of neighbours and the neighbours of each neighbour. This provides ground for a two-hop routing level capability. Generally the node ID database is responsible for optional functional disappearance or reappearance or appearance of nodes. The function for selecting a certain node to transmit at a certain TS considers all the node databases of all nodes which are likely to inter-collide in slots of the channel. The communication network, before each upcoming TS invokes the selection function that determines which is the one node to transmit in the upcoming TS. The function is referred to hereinafter as a "which node is to transmit in the next TS" (WINIT). The function takes into account all the ID available in the node databases of the different nodes associated with the node DB in each node and the WINIT function is activated in each node and for all time slots.

Othernode 30 which is one of the candidates for transmitting in time slot 32, will send packets at time slot 32 only when WINIT function 34 of the local MAC element 36 of othernode 30 orders it to do so. The WINIT, a function of the MAC, receives the actual time (i.e. time slot number) and the list nodes which are likely to inter-collide in slots of the channel. All the nodes activate their slot scheduler, but only one will transmit at the current time slot. Thus, in time slot 40 Mynode 42 is active sending a packet. MAC element 44 of Mynode invokes mynode WINIT 46. Whereas all the other nodes listed in Mynode's database 48, some or all of which request to transmit at that time slot, remain mute with respect to TS 40.

DETAILED DESCRIPTION OF THE PRESENT INVENTION

In accordance with the present invention, a potentially interfering node updatable database associated with the MAC, in each node, contains a limited number of unique identification numbers (UNIDs) referring to nodes likely to interfere with the transmission of the node. Typically these UNIDs are one or two hop neighbours. In addition to the actual nodes, the database also contains unique ID numbers of dummy nodes the use of which is explained below. Practically, the node database does not distinguish between real or dummy nodes. Selecting a certain node to transmit at a certain TS is brought about by a WINIT function described above. This function takes into account all the UNIDs available in the UNID databases of the different nodes. When the WINIT selects a specific UNID to be active in the upcoming TS, the relevant MAC element in the respective node, invokes the transmission. Herein the specification and claims, the terms dummy UNID (or dummy UNIDs) may be used interchangeably with dummy node (or dummy nodes), as UNIDs are numbers in the database that identify (refer to) dummy nodes.

Figure 1:
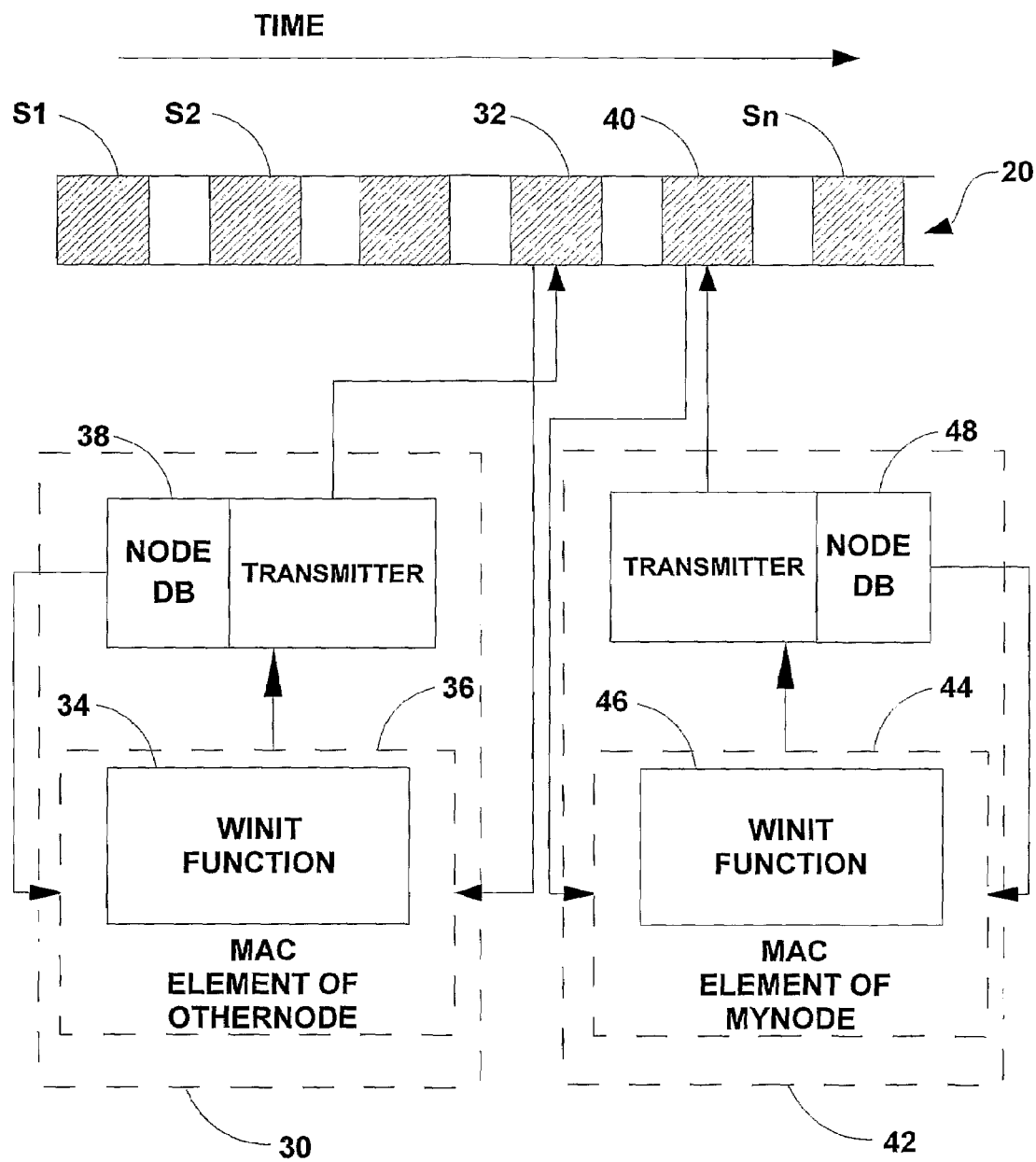
FIG. 1 is a schematic description of the slot selecting system as known in the art.
Figure 2:
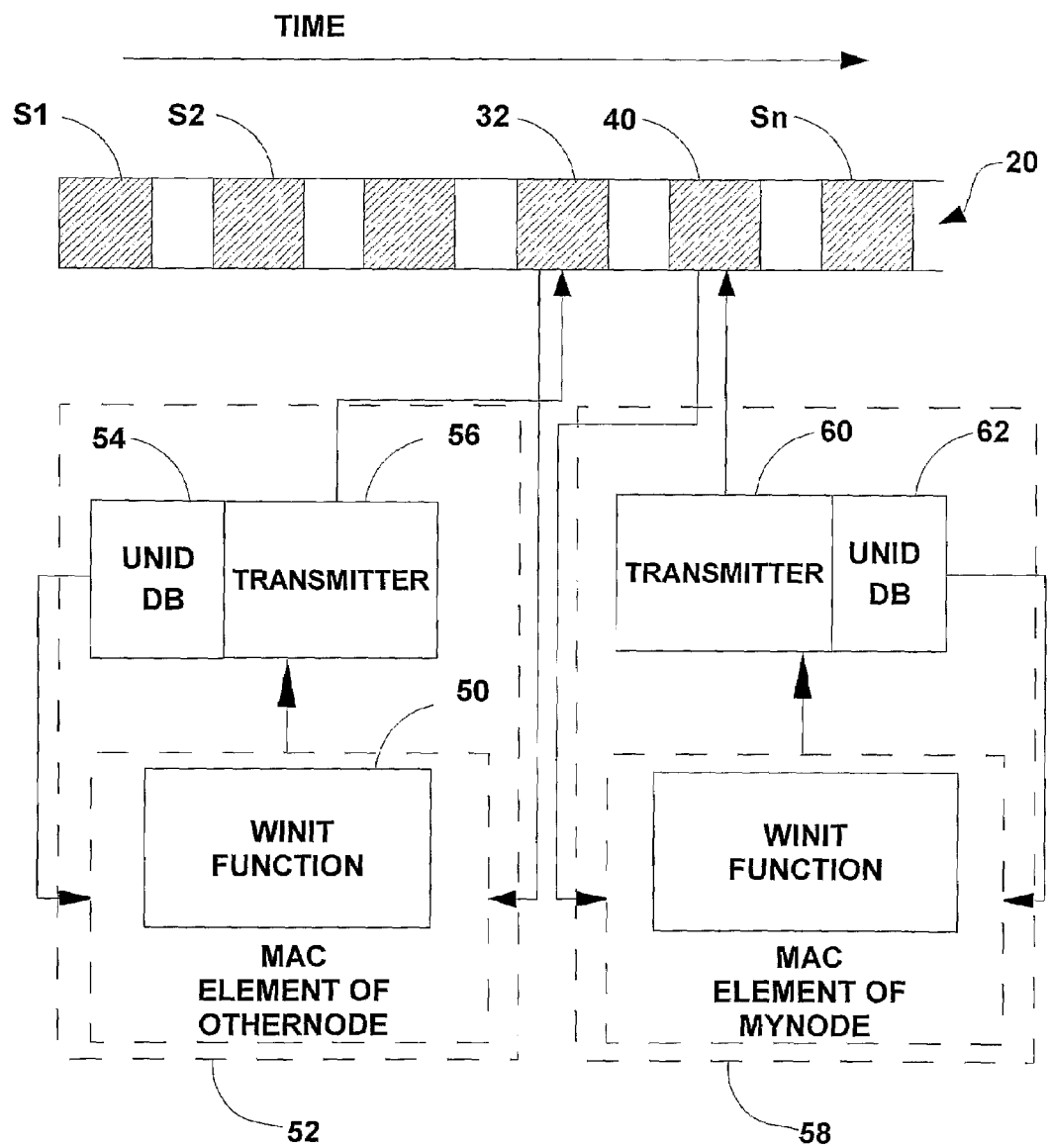
FIG. 2 is a schematic description of the system in accordance with the present invention, explaining the role of the unique node identification number (UNID)

A schematic description of the system in which the invention is implemented is provided in FIG. 2 to which reference is now made. Communications channel 20 employs time slots as explained above. Local node MAC element 50 of node 52 has an associated database periodically receiving updates of the unique node identification number (UNID) as to the number and identity of the UNIDs listed in UNID database 54. In TS 32, WINIT function 50 invokes Othernode 52 to transmit in TS 32, through transmitter 56, whereas no other candidate, such as node 58 will do in TS 32. Later on, for example, in TS 40, node 58 transmits packets, rather than the other candidates, such as node 52. This is realized only if in the UNID database of node 58, an UNID exists, assigned to node 58, which is selected to do so, by a general system function.

Figure 3A:
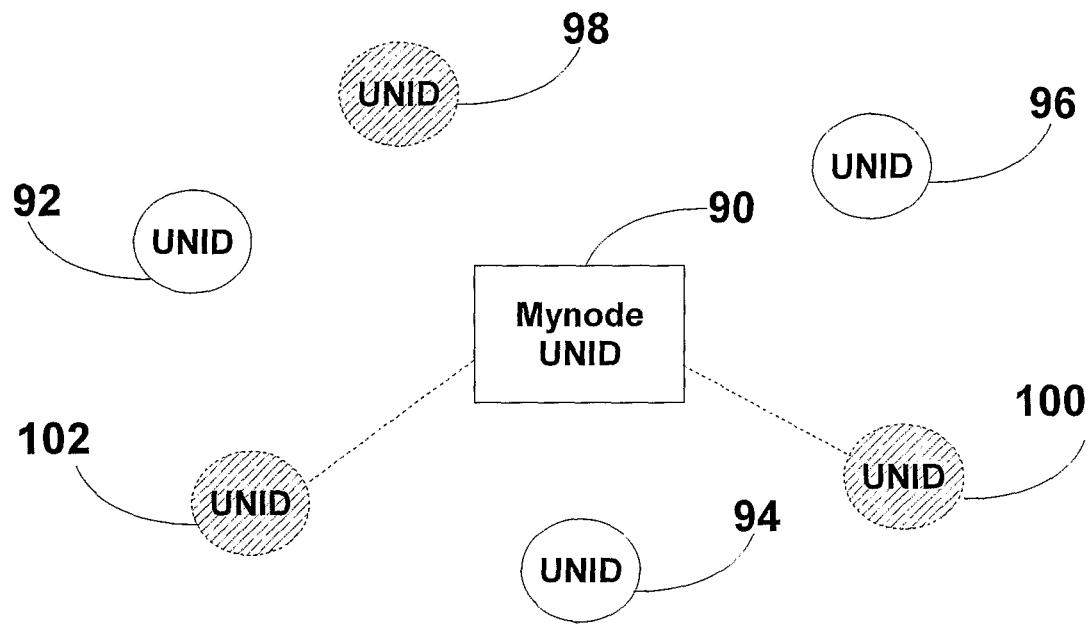
FIG. 3A is a schematic description explaining dummy nodes concept illustrating virtual nodes.
Figure 3B:
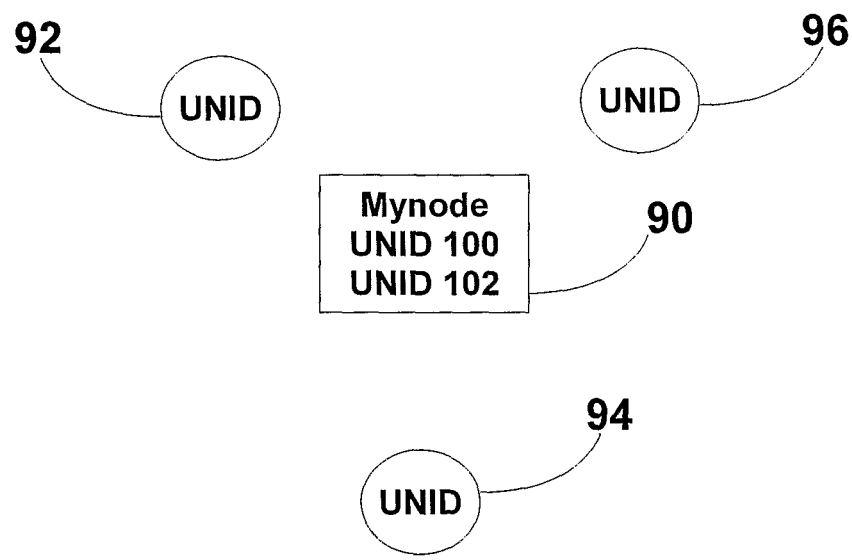
FIG. 3B is a schematic description of UNID assignments to nodes.

From the WINIT function point of view, assigned UNID of every node represents nodes in space but actually some of those "nodes" are dummy nodes, i.e part or all of the nodes have more then one assigned UNID. An example explaining the dummy nodes concept is described In FIGS. 3A-B to which reference is now made. In FIG. 3A, Mynode 90 has 3 listed real UNIDS in its database, i.e. UNID 92, 94 and 96, each having a unique ID number and therefore a unique MAC address. Mynode has also a unique MAC address. In its UNID database Mynode also has three dummy UNIDs, i.e UNID 98, 100 and 102, each having a unique MAC address. Functionally, in this example, two dummy UNIDs are assigned to Mynode 90. As demonstrated in FIG. 3B, node 90 now has three different IDs assigned. Using such UNID assignment each node receives part of the available channel bandwidth in proportion to the ratio between total UNIDs assigned to the node plus the node and the total UNIDs in the UNID database.

Dummy Node Allocation and Trading

Figure 4:
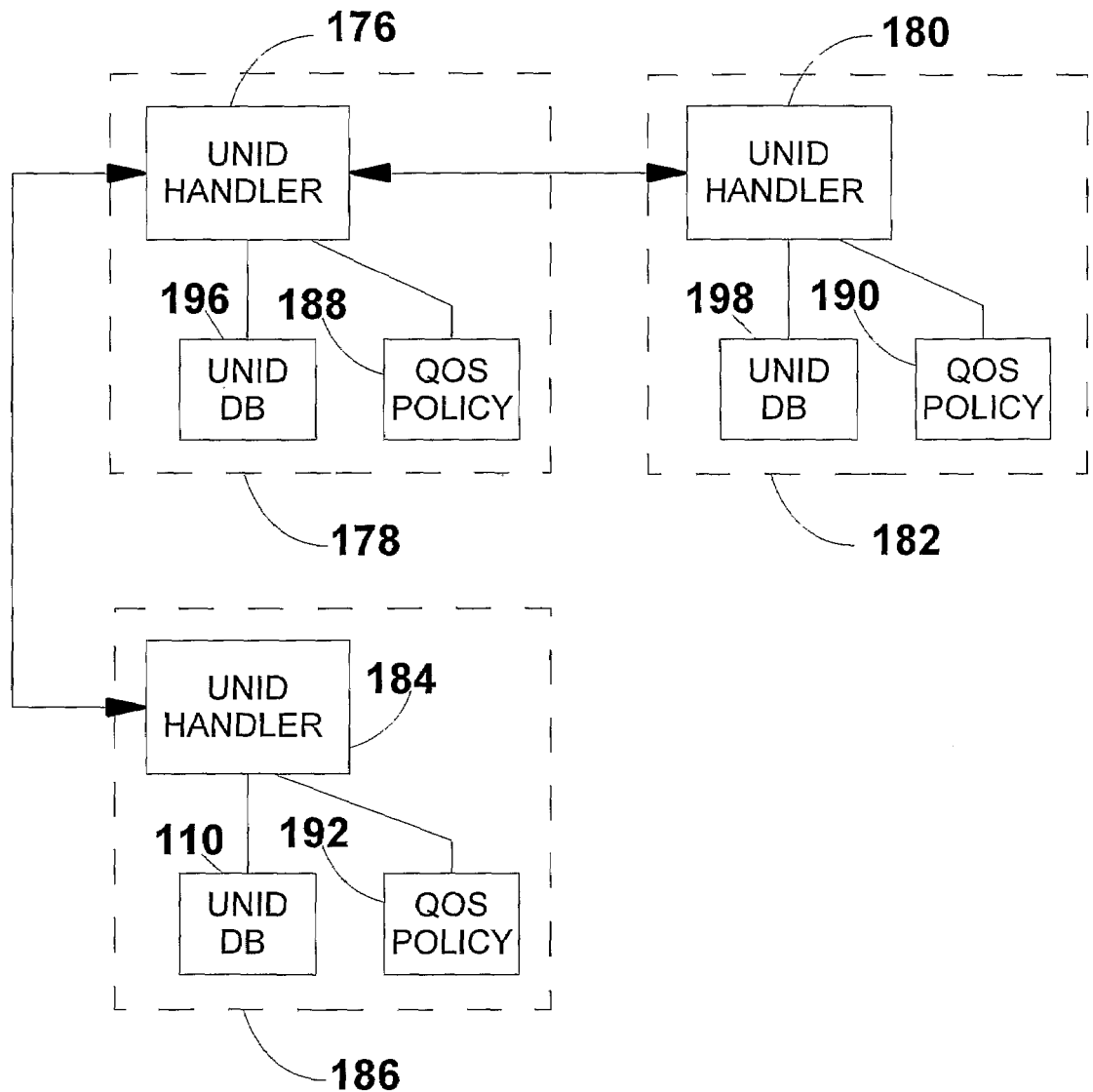
FIG. 4 is a schematic description explaining a specific negotiation mechanism for trading dummy UNIDs.

All connected nodes may trade dummy UNIDs. This can be done using network services, such as routing algorithms. An example describing a specific negation mechanism is described schematically in FIG. 4 to which reference is now made, UNID handler 176 of node 178 negotiates with UNID handler 180 of node 182, as well as with UNID handler 184 of node 186. The UNID handlers trade UNIDs based on QOS policy associated with each node. Thus QOS policies 188, 190 and 192 each provide input to the respective UNID handlers 176, 180 and 184. The UNID handlers also use their respective UNID database to derive information regarding UNID availability allocation in the network, UNID DB 196 of node 178, UNID DB 198 of node 182 and UNID DB 110 of node 186. As the assignments of UNID are made, the DB of the nodes are updated and the WINIT function uses as input updated information.

The implementation of dynamic assignment of UNID to nodes is related to the dynamic bandwidth needs of a node with respect to the other connected nodes. The dynamics is typically related to changes in traffic distribution in the network. For example ad hoc networks often rely on multi hop routing to transmit packets among nodes, which usually employs relay nodes. Thus a relay node may become heavily preoccupied with transmitting packets among nodes, which requires more bandwidth to perform under such circumstances. The assignment of dummy UNIDs to real nodes may be static such that no trading takes place at all. In this case the advantageous use of a plurality of UNIDs in a node is in transmitting in more time slots (by average) with respect to other nodes without changing the channel bandwidth, if applied reflects specific needs related to node priority. In case of dynamically distributing dummy UNIDs, this can be decided by a function involving all nodes or by a single node. The association of dummy UNIDs to real UNIDS can be negotiated between nodes in a multi-hop network using a negotiation application that sends and receives multi-hop messages using the services of the routing algorithm. Thus, a node may send a message requesting more dummy nodes to be associated with, or else, relieving dummy nodes from association.

The UNID Database (DB)

Figure 5:
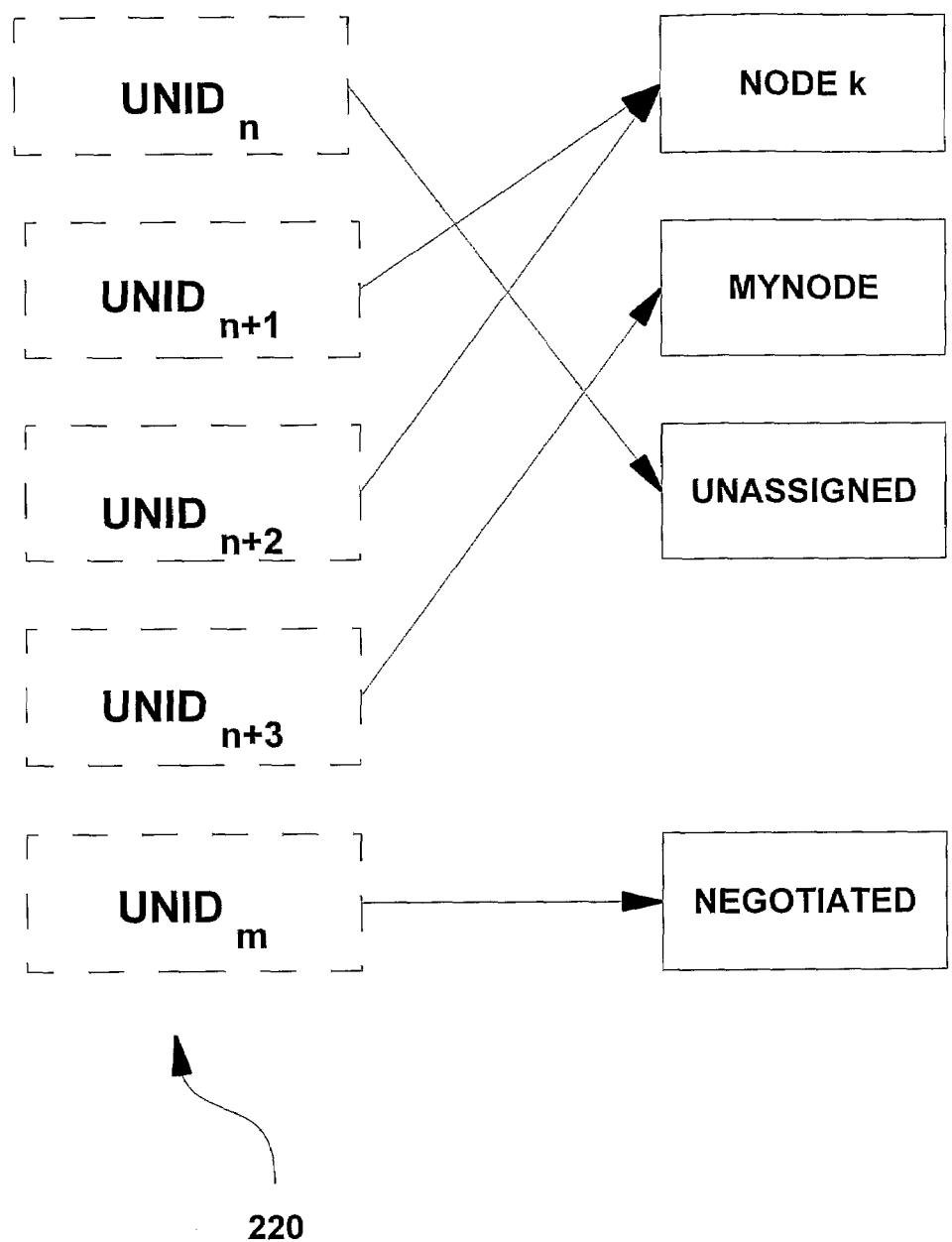
FIG. 5 is a schematic representation of an exemplary UNID DB in Mynode.

In order to provide a more elaborate description of the features of the UNID database, reference is first made to FIG. 5. which is a schematic representation of an exemplary UNID DB in Mynode. The list of UNIDs of network 220 includes four types of UNIDs, real UNIDs the assigned UNIDs, unassigned UNIDs and negotiated UNIDs. Any representation of the DB of a node is transient because of the constant changes potentially brought about by trading of UNIDs between nodes, removal of nodes or addition of nodes. $UNID_{n+1}$ and $UNID_{n+2}$ are assigned to node k, $UNID_{n-3}$ is assigned to mynode, $UNID_n$ unassigned and $UNID_m$ is negotiated.

The invention claimed is:

1. A mobile and wireless ad hoc communications network (MANET) having neither a central organizing node nor pre-defined infrastructure, using a time slotted channel and a distributed MAC protocol, wherein time slots (TSs) are assigned to specific nodes for transmitting packets therein, each such node in said network comprising:
    a potentially interfering-node updatable database containing a limited number of unique node identification numbers (UNIDs), said limited number of unique nodes selected from the group consisting of real nodes and dummy nodes, and each UNID being uniquely addressable by a MAC; and
    a "which node is to transmit in the next TS" (WINIT) function for invoking transmission from a respective UNID in each time slot (TS),
    wherein dummy nodes are assignable to and tradeable between the nodes of said MANET, based on need for bandwidth of the real nodes, and
    wherein each of said nodes receives part of the available channel bandwidth in proportion to the ratio between the total UNIDs assigned to said node plus said node and the total UNIDs in said UNID database.

2. The network as in claim 1, wherein assignment of any of said dummy nodes with any of said real nodes is preconfigured.

3. The network as in claim 1, wherein assignment of any of said dummy nodes with any of said real nodes is negotiable in a negotiation.

4. The network as in claim 3, wherein the negotiation of said assignment of any of said dummy nodes with any of said real nodes is performed between dummy node handlers of respective nodes.

5. The network as in claim 1 further comprising a quality of service policy stored in connection with a UNID database for implementing a quality of service of the respective node.

* * * * *